United States Patent [19]
Coffman

[11] Patent Number: 4,778,551
[45] Date of Patent: Oct. 18, 1988

[54] MINIMAL SCRAP LOSS METHOD FOR MAKING CONTAINERS

[75] Inventor: Paul M. Coffman, Houston, Tex.

[73] Assignee: Rampart Packaging Inc., Williamsburg, Va.

[21] Appl. No.: 863,754

[22] Filed: May 16, 1986

[51] Int. Cl.[4] .................. B29C 51/02; B32B 31/20
[52] U.S. Cl. ...................... 156/224; 156/264; 156/265; 156/267; 264/152; 264/153; 264/512
[58] Field of Search ............ 264/152, 153, 160, 297.1, 264/297.2, DIG. 57, DIG. 67, 167, 512, 297.5, 297.8; 156/222, 224, 264, 250, 270, 182, 244.18, 265, 267

[56] References Cited

U.S. PATENT DOCUMENTS

| | | | |
|---|---|---|---|
| 2,618,311 | 11/1952 | Parker | 156/512 |
| 2,965,932 | 12/1960 | Knowles | 264/251 |
| 3,318,748 | 5/1967 | Hurst | 156/267 |
| 3,519,514 | 7/1970 | Ignell et al. | 156/267 |
| 3,523,474 | 8/1970 | Kinslow, Jr. | 264/153 |
| 4,145,240 | 3/1979 | Polzin | 156/246 |
| 4,181,551 | 1/1980 | Ward | 156/270 |
| 4,234,536 | 11/1980 | Thiel et al. | 264/153 |

Primary Examiner—James Lowe

[57] ABSTRACT

This invention encompasses a process for making multilayer containers by conventional roll fed sheet method, with minimal scrap loss, which comprises the steps of preparing a monolayer sheet of a first thermoplastic material by conventional roll fed sheet methods, cutting or punching billets from a second thermoplastic material sheet, heating the monolayer sheet and the billets to a temperature where both the sheet and the billets become tacky, placing the billets at a position on the sheet so that the billets are in a position over forming cavities in a forming mold at the time of forming, while maintaining the billets and sheet at a temperature where the sheet and billets are tacky and weld together, and forming containers from the welded billets and sheet so that the web scrap left after forming is pure monolayer sheet.

7 Claims, 1 Drawing Sheet

MINIMAL SCRAP LOSS METHOD FOR MAKING CONTAINERS

BACKGROUND OF THE INVENTION

This invention is a method for making containers from multilayer billets with minimal scrap loss.

Containers may be formed by various methods. For example, containers may be formed from "billets"—defined as pieces of material cut from sheet, the perimeter of which is cut to match the outer dimensions of the container.

When containers are thermoformed, and punched or cut out of a multilayer sheet of thermoplastic material, a residual "web" of the uncut material typically represents 35% to 50% of the original uncut sheet.

The resulting web is considered "scrap" and is ground down and referred to as "regrind" and sold, usually at only a fraction of the cost of the materials in the scrap. The scrap is virtually useless. Both the barrier material and the glue are several times more expensive than polypropylene. So it is desired to result in a monolayer web of scrap which does not contain expensive materials. Once reground, the scrap itself, even though it contains expensive materials such as barrier materials, is worth less than the original cost of polypropylene. The problem of how to reduce the amount of scrap generated from conventional thermoforming methods is one that has plagued the industry.

Often it is desirable to coextrude several layers of sheet materials together before cutting out billets. This is to produce a multilayer billet which, when formed, results in a multilayer container. For example, the container could contain layers of polypropylene/tie layer/barrier layer or barrier layer adhesive/polypropylene as just one of many combinations. Barrier layers are quite desirable in many containers.

One of the reasons that "wasting" of the web of scrap is so detrimental is that oftentimes the web of scrap contains expensive materials such as barrier layers (EVAL and the like).

In addition, the time involved in grinding the resulting web of scrap is burdensome since it cannot be reused to make billets.

A method of producing multilayer containers which are thermoformed in a conventional manner utilizing conventional roll fed sheet, is desired where there is no resulting web of multilayer scrap. This has been accomplished by applicant in this invention. Here, the resulting web of *monolayer* scrap may be easily mixed and used again and again.

SUMMARY OF THE INVENTION

This invention encompasses a process for making multilayer containers by a conventional roll fed sheet method, with minimal scrap loss, which comprises the steps of preparing a monolayer sheet of a first thermoplastic material by conventional roll fed sheet methods, cutting or punching billets from a second thermoplastic material, heating the monolayer sheet and the billets to a temperature where the mating surfaces of both the sheet and the billets are at or above the fusion temperature of the mating surfaces so that both the sheet and the billets become tacky, placing the billets at a position on the sheet so that the billets are in a position over forming cavities in a forming mold at the time of forming, while maintaining the billets and sheet at a temperature where the sheet and billets are tacky and weld together, and forming containers from the welded billets and sheet so that the web scrap left after forming is pure monolayer sheet. Two or more billets may be stacked one on top of the other and then placed in position on the sheet.

DETAILED DESCRIPTION OF THE INVENTION

Figure 1:
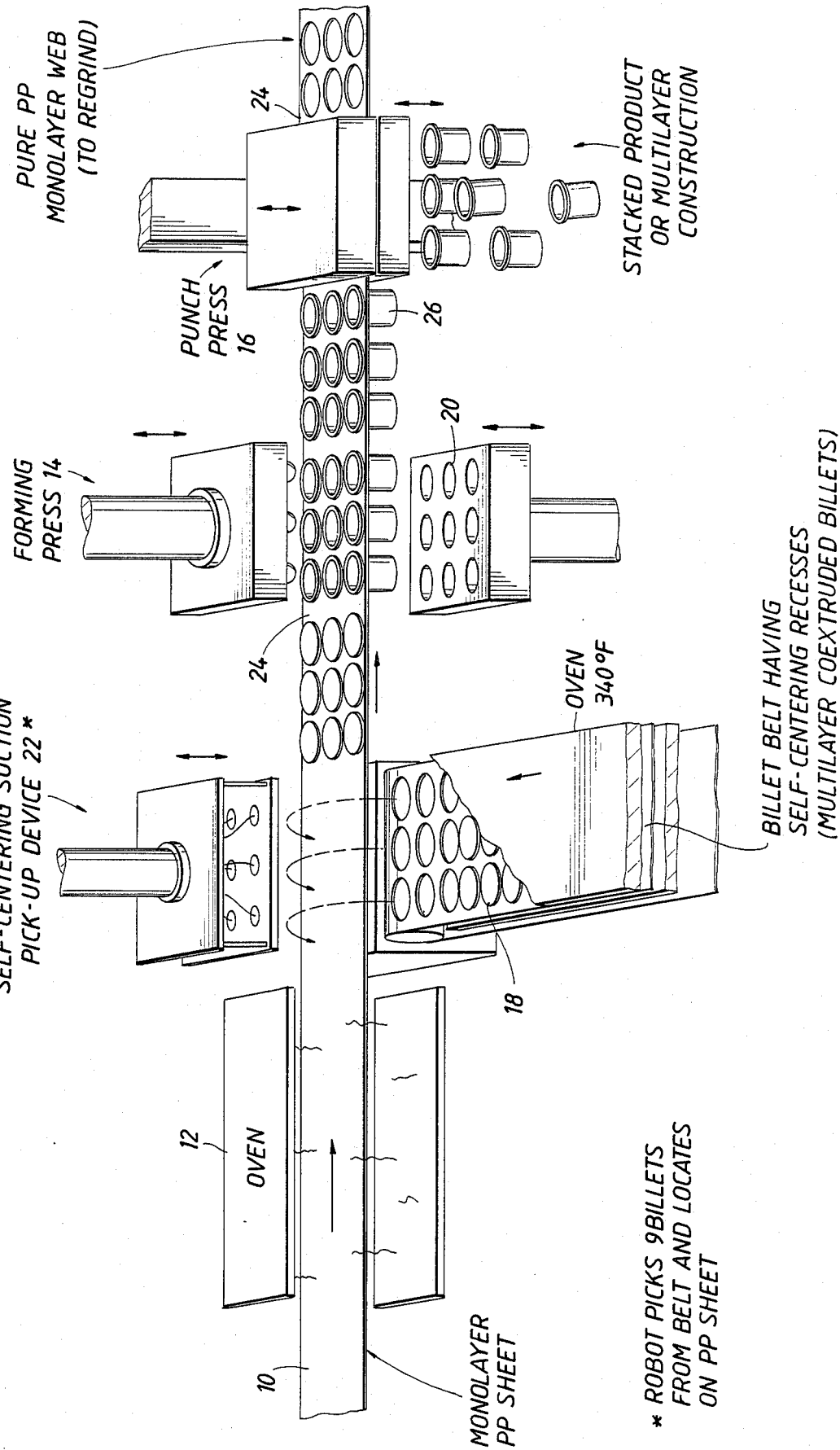
FIG. 1 illustrates a process of making multilayer parts from the coextruded billet welded to a monolayer sheet.

As may be seen in FIG. 1, a sheet 10 of monolayer thermoplastic material is processed in the normal manner through a radiant oven 12, and multicavity mold or forming press 14 and a down-line punch press 16. The monolayer sheet 10 should be substantially polypropylene but may also contain polyethylene, polystyrene, PET, etc. The sheet 10 in this case is being compared with that to be formed. The normal forming line is increased in length by two index lengths and in the first of these molten coextruded billets 18 are located precisely where they will index over the forming cavity 20. To aid in this location, a flat plate with teflon coating is located under the sheet 10 after the oven 12. This plate is heated and contains vacuum holes so that the molten sheet 10 is sucked flat before a robotic device 22 deposits the billets in place. The robotic device 22 has some type of self centering suction mechanism so as to pick up the billets 18 and deposit them on the appropriate portion of sheet 10. The sheet 10 then moves to a neutral station and then to the forming station 14 where the molten billets 18 weld to the sheet 10 and are formed along with the monolayer sheet 10 to which they are welded. The mating surfaces of billets 18 and monolayer sheet 10 must be of a material so that when heated, they will weld together. For example, a monolayer sheet consisting of a blend of polypropylene and polyethylene will weld to a billet mating surface of polypropylene. The billet 18 is totally consumed in the finished part while the web 24, which must be reground, is substantially pure monolayer. The formed parts 26 proceed to some type of punch press 16 and are accummulated in traditional fashion. All equipment involved is traditional with thermoformers except the billet heating oven 12 and robotic device 22. The residual web 24 is reground and reprocessed.

EXAMPLE 1

A 100 mil billet of five layers of polypropylene, glue, EVAL, glue, and polypropylene is cut and stacked so that the polypropylene makes up 80%, the glue 10% and EVAL 10%. A monolayer sheet of polypropylene of 25 mils was prepared. This results in a container of 65% polypropylene layer, 5% glue layer, 10% EVAL layer, 5% glue layer and 40% polypropylene layer.

It is to be understood that many different embodiments may be apparent to one of ordinary skill in the art and different materials may be substituted for those mentioned herein.

I claim:

1. A process for making multilayer containers by a conventional roll fed sheet method with minimal scrap loss, which comprises the steps of:

preparing a monolayer sheet of a first thermoplastic material for conventional roll fed sheet methods;

preparing a second sheet of at least one layer of at least one thermoplastic material;

cutting or punching billets from said second sheet;

heating said monolayer sheet and said billets to a temperature where the mating surfaces of both said sheet and said billets are at or above the fusion temperatures of said mating surfaces;

placing said billets at a position on said sheet so that said billets are in a position over forming cavities in a forming mold at the time of forming, while maintaining said billets and said sheet at or above the mating surface fusion temperature so that said billets and said sheet weld together; and thermoforming containers from said welded billets and sheet so that the web scrap left after forming is substantially pure monolayer sheet.

2. The process of claim 1, wherein said monolayer sheet is substantially polypropylene.

3. The process in claim 1, wherein said monolayer sheet which has been heated is sucked flat against a heated plate under said sheet prior to placement of said billets into forming position.

4. A process for making multilayer containers from multilayer billets with minimal scrap loss, which comprises the steps of:

preparing a monolayer sheet which is substantially polypropylene;

preparing a second sheet of more than one layer of more than one thermoplastic material;

cutting or punching multilayer billets from said second sheet;

heating said monolayer sheet and said billets to a temperature where the mating surfaces of both said monolayer sheet and said billets are at or above the fusion temperature of said mating surfaces;

sucking said monolayer sheet flat against a heated plate under said monolayer sheet;

placing said billets at a position on said monolayer sheet so that said billets are in a position over forming cavities in a forming mold at the time of forming, while maintaining said billets and said monolayer sheet at a temperature where said monolayer sheet and said billets are tacky and weld together; and thermoforming containers from said welded billets and monolayer sheet so that the web scrap left after forming is pure monolayer sheet.

5. The processes of claims 1 or 4 wherein said second sheet is comprised of layers of a thermoplastic, glue and a barrier material.

6. A process for making multilayer containers from multilayer billets with minimal scrap loss, which comprises the steps of:

preparing a monolayer sheet of a first thermoplastic material which is substantially polypropylene;

preparing a second sheet comprising layers of polypropylene, a glue and EVAL;

cutting or punching multilayer billets from said second sheet;

heating said monolayer sheet and said billets to a temperature where the mating surfaces of both said monolayer sheet and said billets are at or above the fusion temperatures of said mating surfaces;

sucking said monolayer sheet flat against a heated plate under said monolayer sheet;

placing said billets of a position on said monolayer' sheet so that said billets are in a position over forming cavities in a forming mold at the time of forming while maintaining said billets and said monolayer sheet at a temperature where said monolayer sheet and said billets are tacky and weld together; and thermoforming containers from said welded billets and monolayer sheet so that the web scrap left after forming is pure monolayer sheet.

7. The processes in claims 1, 4 or 6 wherein two or more of said billets are stacked together and then placed as a stack on said monolayer sheet.

* * * * *